United States Patent
Hammond et al.

(10) Patent No.: US 7,114,098 B2
(45) Date of Patent: Sep. 26, 2006

(54) POWER SUPPLY CRITICAL STATE MONITORING SYSTEM

(75) Inventors: Brad T. Hammond, North Kingstown, RI (US); Daniel J. Redmond, Bradford, RI (US); Jeffrey B. Collemer, Cumberland, RI (US); Todd J. Giaquinto, Cranston, RI (US); Diane M. L'Heureux, Middletown, RI (US)

(73) Assignee: American Power Conversion Corporation, West Kingston, RI (US)

( * ) Notice: Subject to any disclaimer, the term of this patent is extended or adjusted under 35 U.S.C. 154(b) by 279 days.

(21) Appl. No.: 09/812,657

(22) Filed: Mar. 20, 2001

(65) Prior Publication Data

US 2002/0138785 A1    Sep. 26, 2002

(51) Int. Cl.
    *G06F 11/00* (2006.01)
(52) U.S. Cl. ............................. 714/22; 714/44
(58) Field of Classification Search ................. 714/22, 714/44, 48, 14
    See application file for complete search history.

(56) References Cited

U.S. PATENT DOCUMENTS

| | | | | |
|---|---|---|---|---|
| 5,522,034 A | * | 5/1996 | Watari et al. | 714/22 |
| 5,559,958 A | * | 9/1996 | Farrand et al. | 714/27 |
| 5,781,448 A | * | 7/1998 | Nakamura et al. | 700/293 |
| 5,889,933 A | * | 3/1999 | Smith | 714/22 |
| 5,955,946 A | * | 9/1999 | Beheshti et al. | 340/506 |
| 6,332,142 B1 | * | 12/2001 | LeBlanc | 707/100 |
| 6,425,087 B1 | * | 7/2002 | Osborn et al. | 713/340 |
| 6,549,880 B1 | * | 4/2003 | Willoughby et al. | 703/13 |
| 2001/0020283 A1 | * | 9/2001 | Sakaguchi | 714/22 |
| 2003/0055947 A1 | * | 3/2003 | Haneda | 709/224 |
| 2003/0097619 A1 | * | 5/2003 | Parry | 714/48 |

OTHER PUBLICATIONS

American Power Conversion, Power Net, 8 pgs. (1997).

* cited by examiner

*Primary Examiner*—Bryce P. Bonzo
(74) *Attorney, Agent, or Firm*—Mintz, Levin, Cohn, Ferris, Glovsky and Popeo, P.C.

(57) ABSTRACT

A system and method for providing critical state monitoring for a power supply, such as an uninterruptible power supply (UPS), is provided. In one embodiment, the invention includes a notification system for at least one power supply coupled to a computer network and adapted to transmit information such as a trap over the computer network when one of the power supplies undergoes the entry of a critical state, wherein the notification system includes a computer system connected to the computer network and has running on it a monitoring program, a reporting program and a database. The monitoring program monitors the network and detects the information being associated with the entry of the critical state. The database stores the information relating to the information transmitted over the network being associated with the entry of the critical state. The reporting program reports over the computer network the information relating to the duration of the critical state. In another embodiment, the invention includes a method of providing over a computer network a notification of a power supply in a critical state.

26 Claims, 3 Drawing Sheets

POWER SUPPLY CRITICAL STATE MONITORING SYSTEM

FIELD OF THE INVENTION

The present application relates generally to power supply systems. More specifically, it relates to critical state monitoring for one or more uninterruptible power supply (UPS) systems.

BACKGROUND OF THE INVENTION

The use of UPS's having battery back-up systems to provide regulated, uninterrupted power for critical and/or sensitive loads, such as computer systems, and other data processing systems is well known. In one application, one to several UPS's can be connected to a computer network so that the network can communicate with each UPS to allow remote monitoring and control of the UPS's.

In some instances, it may be necessary or desirable to know how long a network connected UPS was inoperative or operating on a battery. Prior methods of detecting the downtime of a UPS included manually searching through trap logs to look for a critical state change of a UPS and making an estimate of the amount of time the UPS was down. However, the methods can be ineffective and time consuming if hundreds or thousands of UPS's are connected to a computer network.

One device, PowerNet, manufactured by the American Power Conversion of W. Kingston, R.I., provides to a user on a computer network a notice of a UPS failure. However, PowerNet doesn't provide a user with a notice of the failure's duration.

SUMMARY OF THE INVENTION

The present invention provides automated systems and methods for monitoring one or more power supplies, such as UPS's, in a critical state over a computer network. In one embodiment, the invention includes a notification system for at least one power supply coupled to a computer network and adapted to transmit information such as a trap over the computer network when one of the power supplies undergoes the entry of a critical state, wherein the notification system includes a computer system connected to the computer network and has running on it a monitoring program, a reporting program and a database. The monitoring program monitors the network and detects the information being associated with the entry of the critical state. The database stores information relating to the information transmitted over the network being associated with the entry of the critical state. The reporting program reports over the computer network the information relating to the duration of the critical state.

In another embodiment, the invention includes a method of providing over a computer network a notification of a power supply in a critical state, the method including: monitoring the computer network for an indication that a power supply has entered a critical state, polling the power supply at predetermined time intervals until a poll indicates that the power supply has left the critical state, storing information relating to the critical state of the power supply, and reporting over the computer network the information relating to a duration of the critical state of the power supply.

One advantage of embodiments of the invention is that the system is able to automatically determine the status and downtime duration of any power supply or UPS connected to a computer network. Another advantage of embodiments of the invention is that a user connected to the network can easily obtain the status information about a network connected power supply or UPS by accessing a network server

DETAILED DESCRIPTION OF THE INVENTION

Figure 1:
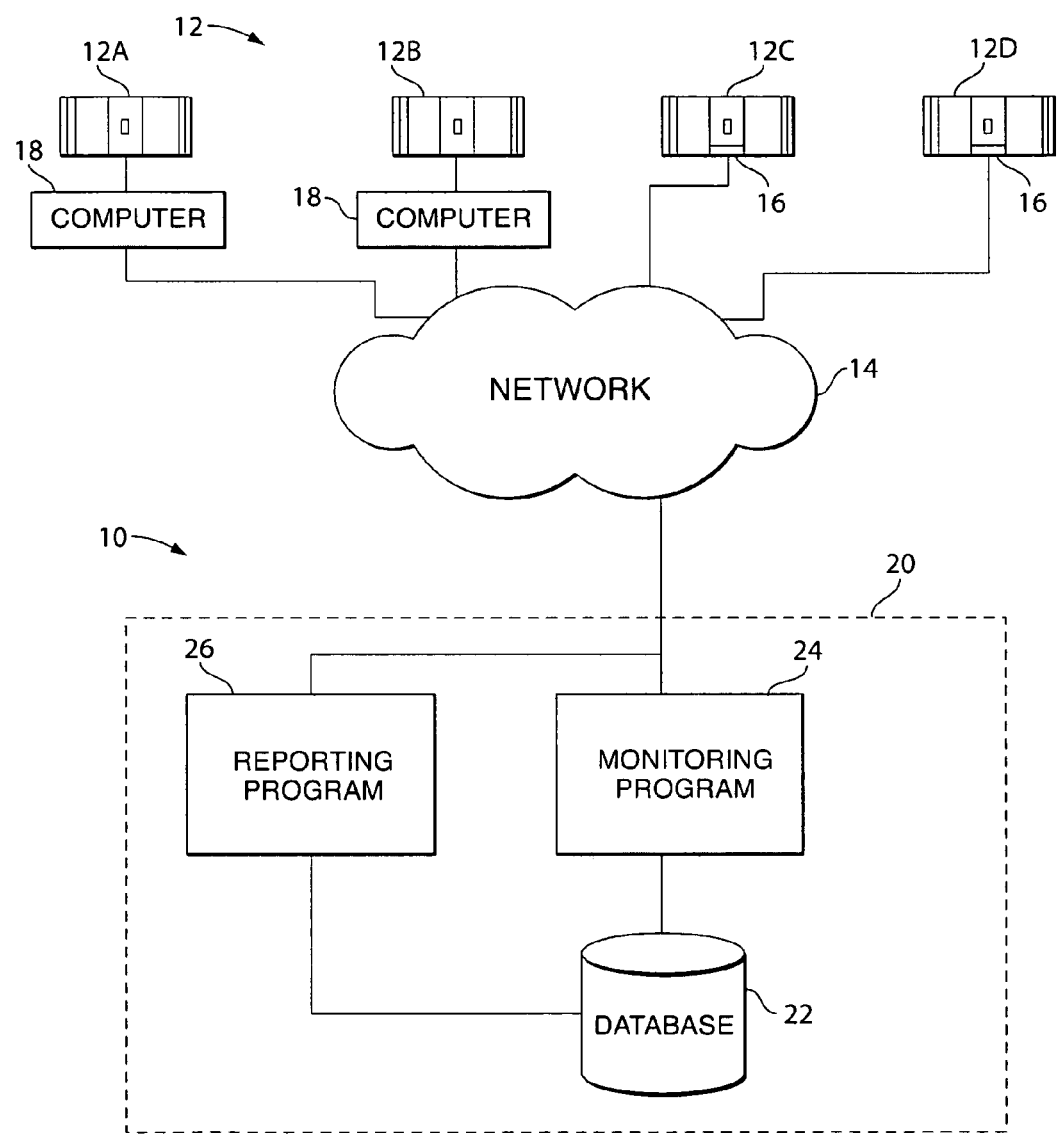
FIG. 1 is a block diagram of the power supply critical state monitoring system according to the present invention.

Referring to FIG. 1, the power supply critical state monitoring system 10 can include one or more uninterruptible power supplies (UPS) 12a–12d that are each connected to a computer network 14. Each UPS 12 can be connected to the network through the use of a network card 16 in the UPS or the UPS can be serially connected to a computer 18 that has a network card. Also connected to the network is a server computer 20. Server computer 20 has a database 22 and one or more software programs running thereon. For example, the server can have a monitoring program 24 and a reporting program 26 as described below. The server can use the simple network management protocol (SNMP) to communicate with the one or more UPS's.

In one embodiment of the invention, the monitoring program 24 listens over the network for information transmitted from a UPS 12 indicating that a UPS is in a critical state, such as a low battery, an expired battery or a loss of UPS communication with the network. The information indicating that a UPS has entered a critical state can be a trap issued over a network such as a SNMP network, packetized data sent over a network or any type of information that would indicate to the server computer that UPS has entered a critical state. Once monitoring program 24 receives information such as a trap that indicates that a UPS 12 has entered a critical state, the monitoring program polls the UPS to determine what is the critical state of the UPS. The monitoring program will attempt to determine whether the critical state is due to an expired battery, due to a loss of communications with the UPS 12 or if the source of the critical state is unknown. Monitoring program 24 stores data relating to the critical state on database 22. The data that the monitoring program 24 stores can include information relating to the beginning of the critical state, the ending of the critical state, the duration of the critical state and/or the state of a UPS each time the program monitors the UPS. Reporting program 26 reports over the network 14 information relating to one or more critical states, such as a critical state duration, or a lack thereof when a user requests the information. Alternatively, the reporting program can automatically report certain information when a predetermined event occurs, such as the occurrence of a critical state.

Figure 2:
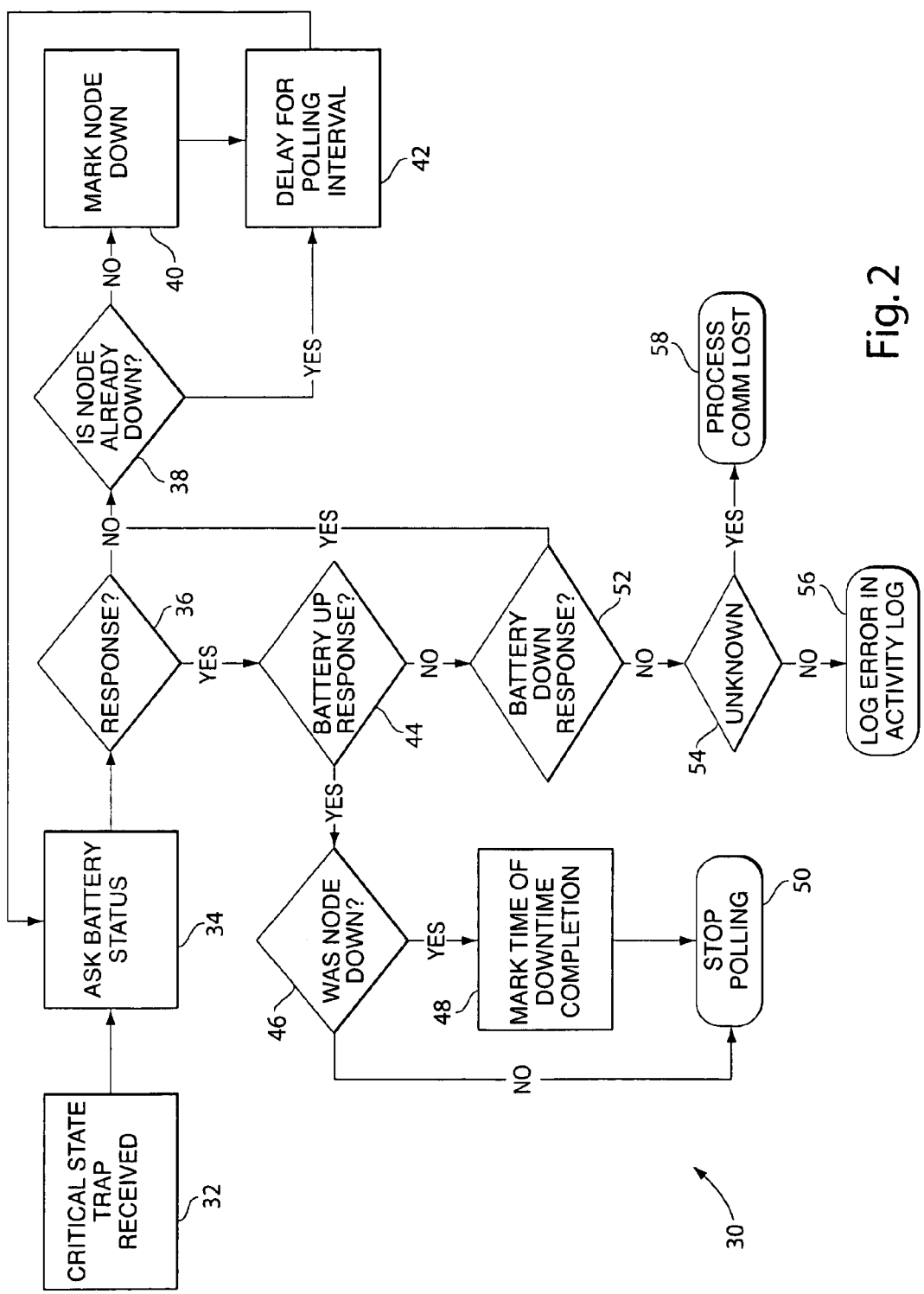
FIG. 2 is a flowchart of an exemplary method of monitoring a power supply according to the present invention.

FIG. 2 shows an exemplary method of monitoring one or more UPS's for a critical state over a computer network. At 32, the monitoring program determines that a UPS is in a critical state. This can be determined, for example, by receiving a trap or packetized data from the UPS over the computer network. At 34, the monitoring program polls the UPS to determine the status of its one or more batteries. If at 36, the monitoring program doesn't receive a response from the UPS after polling it, the monitoring program determines at 38 if it already has stored information that it didn't receive a response from that UPS. If the monitoring program didn't record the lack of a UPS response, it notes the lack of a response at 40 and then delays for a predetermined time before polling the UPS again at 34. The program can note the lack of a response by storing it on a hard disk, floppy disk or on another type of permanent storage device or can store it in the server computer system's random access memory or on another type of temporary storage device. If the program has already noted that the UPS hasn't responded, at 42 the monitoring program delays for a predetermined time before polling the UPS again at 34.

If at 36 the monitoring program does receive a response from the UPS after polling the UPS, the monitoring program determines at 44 if the response indicated that the battery is operative. If the battery is operative, the monitoring program determines at 46 if it previously noted that the UPS battery was inoperative. If the monitoring program determines at 46 that it did previously note that the battery was inoperative, the program at 48 calculates and stores the length of downtime for the UPS battery and then stops polling the UPS at 50. Otherwise, if the monitoring program determines at 46 that it didn't previously note that the battery was inoperative, the program stops polling the UPS at 50 because it assumes that the UPS battery is and has been operational.

If the monitoring program didn't receive a response from the UPS that the battery is operative at 44, it determines at 52 if it received a response indicating that the battery is inoperative. If the monitoring program did receive a battery inoperative response at 52, the program proceeds to 38 and determines if it already has stored information that it did receive an inoperative battery response from that UPS. At 38, the monitoring program determines if it already noted that the UPS battery is inoperative and notes it at 40 if it previously did not. The monitoring program then continues polling the UPS at 42.

If at 52, the monitoring program didn't receive a response from the UPS that the battery is operative or inoperative, it determines at 54 if the response it received was unknown. If the UPS response is known, at 56 the program notes a log error in the system's activity log. Otherwise, if the response is unknown, at 58 the program assumes that it has lost communication with the UPS and can proceed to a method such as, for example, the method shown in FIG. 3.

Figure 3:
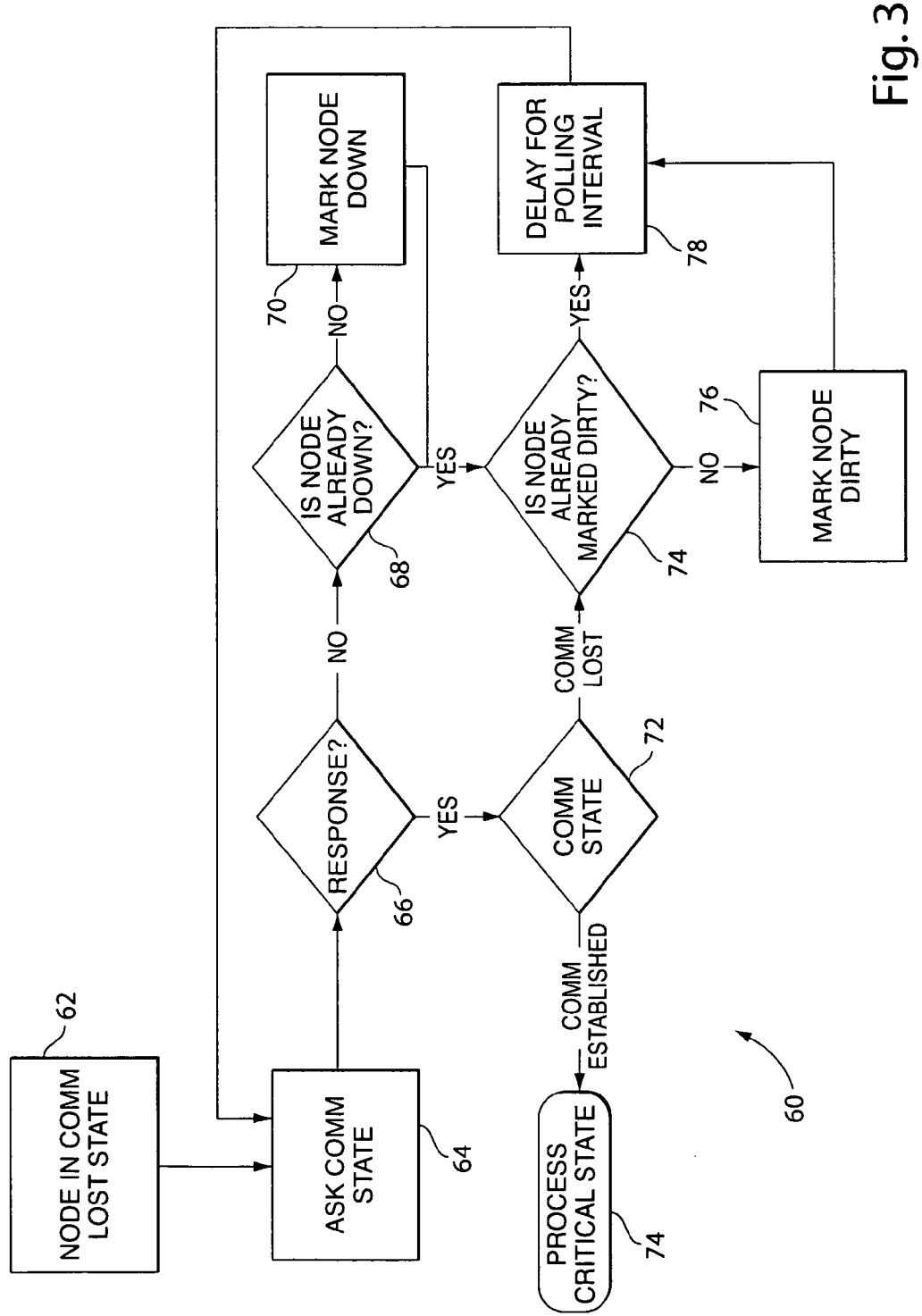
FIG. 3 is a flowchart of an exemplary method of monitoring a power supply once it is determined that the power supply has lost communication with a computer network.

Referring to FIG. 3, once the monitoring program has determined that it has lost communication with the UPS, it will poll the UPS at 64 to determine if a change has occurred in its communication state. The program will then determine at 66 if it received a response.

If the program didn't receive a response at 66, the program proceeds to 68 and determines if it already has stored information that it didn't receive a response from that UPS. If the program has already noted that the UPS hasn't responded, the monitoring program proceeds to 74. Otherwise, if the monitoring program didn't record the lack of a UPS response, it notes the lack of a response at 70 and proceeds to 74.

If the program did receive a response at 66, the program proceeds to 72 and determines the communication state of the UPS. If communication has been reestablished, then at 75 the program processes the critical state of the UPS so that the status can be accessed by computers connected to the computer network. If the program determines that network communication is still lost with the UPS, the program proceeds to 74.

At 74, the program determines if it already has stored information that communication was lost with UPS, which is also known as the UPS's node on the network being "dirty." If the program has already noted the loss of communication with the UPS, the monitoring program proceeds to 78 to begin polling the UPS after a predetermined delay time. Otherwise, if the monitoring program didn't record the loss of communication with the UPS, it notes the loss of communication at 76 and proceeds to 78 to begin polling the UPS after a predetermined delay time. Thus, in the embodiment of FIG. 3, the monitoring program will continuously poll a UPS that has lost communication with the network until it can determine that communication has been reestablished with the UPS.

Once data is stored on the database 22 about the critical state of a UPS, the reporting program 26 can report the information to a user that requests it or can send the information to a predetermined number of users.

It should be understood that although the description above has described embodiments of the invention as having a separate monitoring program and a reporting program, the two programs can easily be combined within one program or could be separated into more than two programs and still be within the scope of the invention. The software can be stored on computer usable medium for storing data, such as, for example, but not limited to, floppy disks, magnetic tape, zip disks, hard drives, CD-ROM, optical disks, or a combination of these.

It should be also understood that although the description above has described embodiments of the invention as used with a UPS, the invention is also applicable to systems using one or more power supplies connected to a computer network.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A notification system for at least one power supply coupled to a computer network and adapted to transmit data over the computer network when the at least one power supply undergoes an entry of a critical state, the notification system comprising:
   a computer system connected to the computer network, the computer system being adapted to:
      monitor in substantially real time information transmitted over the computer network and detect in substantially real time an occurrence of the data being associated with an actual entry of the critical state and an actual exit of the critical state;
      store information relating to the data being associated with the entry and exit of the critical state; and
      report over the computer network at least one of: (i) a combination of an actual entry time of the critical state and an actual exit time of the critical state, and (ii) an actual duration of time as a difference between the actual entry time and the actual exit time of the critical state.

2. A notification system of claim 1, further comprising the at least one power supply coupled to a computer network, wherein the power supply includes a network card coupled to the computer network for communicating with the computer network.

3. A notification system of claim 1, further comprising a computer coupled to the at least one power supply and having a network card coupled to the computer network.

4. A notification system of claim 1, further comprising the at least one power supply coupled to the computer network.

5. A notification system of claim 1, wherein the critical state is a loss of output power of a battery.

6. A notification system of claim 1, wherein the critical state is a loss of communication with a power supply.

7. A notification system of claim 1, wherein the data being associated with the actual entry of the critical state is packetized data.

8. A notification system of claim 1, wherein the data being associated with the actual entry of the critical state is a trap.

9. A notification system of claim 1, wherein the computer system is further adapted to poll the at least one power supply at one or more predetermined time intervals in response to detection of an occurrence of the data being associated with the actual entry of the critical state.

10. A notification system of claim 9, wherein the computer system is further adapted to determine from one or more polls an actual operative state of the at least one power supply.

11. A notification system for at least one power supply coupled to a computer network and adapted to transmit data over the computer network when the at least one power supply undergoes an entry of a critical state, the notification system comprising:
    a computer system connected to the computer network, the computer system being adapted to:
        monitor information transmitted over the computer network and detect in substantially real time an occurrence of the data being associated with an actual entry of the critical state;
        store information relating to the data being associated with the entry and exit of the critical state; and
        report over the computer network information relating to a duration of the critical state;
        wherein the computer is further adapted to, in response to detecting the occurrence of the data being associated with the actual entry of the critical state, continuously poll the power supply system over the computer network at predetermined time intervals until a poll indicates that the power supply system has actually left the critical state.

12. A notification system for a plurality of power supplies each coupled to a computer network and each adapted to transmit a trap over the computer network when the power supply undergoes an entry of a critical state, the notification system comprising:
    a computer system connected to the computer network, the computer system being adapted to:
        monitor information transmitted over the computer network and detect in substantially real time a trap being associated with an actual entry of the critical state, wherein upon detecting from a power supply the trap being associated with the actual entry of the critical state, the power supply is polled at predetermined time intervals until a poll indicates that the power supply has actually left the critical state;
        store information relating to the trap being associated with the entry of the critical state of each power supply; and
        report over the computer network the information relating to an actual duration of each critical state of each power supply, the actual duration being a difference between an actual entry time of the critical state and an actual exit time of the critical state the computer system detects in substantially real time.

13. A notification system of claim 12, further comprising the plurality of power supplies coupled to a computer network, wherein each power supply includes a network card coupled to the computer network for communicating with the computer network.

14. A notification system of claim 12, further comprising the plurality of computers each having a network card coupled to the computer network, wherein one computer is coupled to each of the power supplies.

15. A notification system of claim 12, further comprising the plurality of power supplies coupled to the computer network.

16. A notification system of claim 12, wherein the critical state is a loss of output power of a battery.

17. A notification system of claim 12, wherein the critical state is a loss of communication with a power supply.

18. A notification system for a plurality of power supplies each coupled to a computer network and each adapted to transmit a trap over the computer network when the power supply undergoes an entry of a critical state, the notification system comprising:
    a computer system connected to the computer network, the computer system including:
        means for monitoring information transmitted over the computer network and means for detecting in substantially real time a trap being associated with an actual entry of the critical state, wherein upon detecting from a power supply the trap being associated with the actual entry of the critical state, the means for monitoring polls the power supply at predetermined time intervals until a poll indicates that the power supply has actually left the critical state;
        means for storing information relating to a duration of each critical state of each power supply; and
        means for reporting over the computer network the information relating to the actual duration of each critical state of each power supply, the actual duration being a difference between an actual entry time of the critical state and an actual exit time of the critical state the computer system detects in substantially real time.

19. A notification system of claim 18, further comprising:
    the computer network;
    the plurality of power supplies each coupled to the computer network and adapted to transmit a trap over the computer network when the power supply undergoes an entry of a critical state; and
    means for coupling each of the plurality of power supplies to the computer network.

20. A method of providing over a computer network a notification of a power supply in a critical state, the method comprising:
    monitoring the computer network for an indication that a power supply has actually entered a critical state;
    polling the power supply at predetermined time intervals until a poll indicates that the power supply has actually left the critical state;
    storing information relating to the critical state of the power supply; and
    reporting over the computer network the information relating to an actual duration of the critical state of the power supply, the actual duration being a difference between an actual entry time of the critical state and an actual exit time of the critical state detected over the computer network in substantially real time.

21. The method of claim 20, further comprising transmitting a trap from the power supply over the network to provide the indication that the power supply has entered the critical state.

22. The method of claim 20, wherein storing information relating to each critical state comprises storing information on a database relating to a duration of each critical state of each power supply.

23. A method of providing over a computer network a notification of a power supply in a critical state, the method comprising:
    monitoring in substantially real time the computer network for an indication that a power supply has actually entered a critical state;
    if the power supply has actually entered a critical state, monitoring over the computer network for an actual status of a battery of a power supply;
    if monitoring has indicated that the battery is operative and was previously inoperative, recording an actual time period that the battery was inoperative; and
    if monitoring has indicated that communication is reestablished but was previously lost with the power supply, recording an actual time period that communication was lost with the power supply.

24. The method of claim 23, further comprising:
    if monitoring has indicated that the battery is inoperative, polling the power supply at a predetermined time interval.

25. The method of claim 24, further comprising:
    if monitoring has indicated that communication is lost to the power supply, polling the power supply at a predetermined time interval.

26. An article of manufacture, comprising:
    a computer usable medium having computer readable program code means embodied therein for providing over a computer network a notification of a power supply in a critical state, the computer readable program code means in said article of manufacture comprising:
    computer readable program code means for causing the computer system to monitor the computer network and to detect in substantially real time an indication transmitted over the computer network that a power supply has actually entered a critical state;
    computer readable program code means for causing the computer system to poll the power supply at predetermined time intervals until a poll indicates that the power supply has actually left the critical state;
    computer readable program code means for causing the computer system to store information relating to the critical state of the power supply; and
    computer readable program code means for causing the computer system to report over the computer network the information relating to an actual duration of the critical state of the power supply, the actual duration being a difference between an actual entry time of the critical state and an actual exit time of the critical state the computer system detects in substantially real time.

* * * * *